(No Model.)

L. D. McINTOSH.
MILLAMPÈRE METER.

No. 460,650. Patented Oct. 6, 1891.

Witnesses:
Fred Gerlach
[signature]

Inventor.
Lyman D. McIntosh

UNITED STATES PATENT OFFICE.

LYMAN D. McINTOSH, OF CHICAGO, ILLINOIS.

MILLAMPÈRE-METER.

SPECIFICATION forming part of Letters Patent No. 460,650, dated October 6, 1891.

Application filed September 5, 1890. Serial No. 360,063. (No model.)

*To all whom it may concern:*

Be it known that I, LYMAN D. MCINTOSH, a citizen of the United States, residing at Chicago, in the county of Cook and State of Illinois, have invented certain new and useful Improvements in Millampère-Meters; and I do hereby declare that the following is a full, clear, and exact description of the invention, which will enable others skilled in the art to which it pertains to make and use the same, reference being had to the accompanying drawings, in which—

Figure 1:
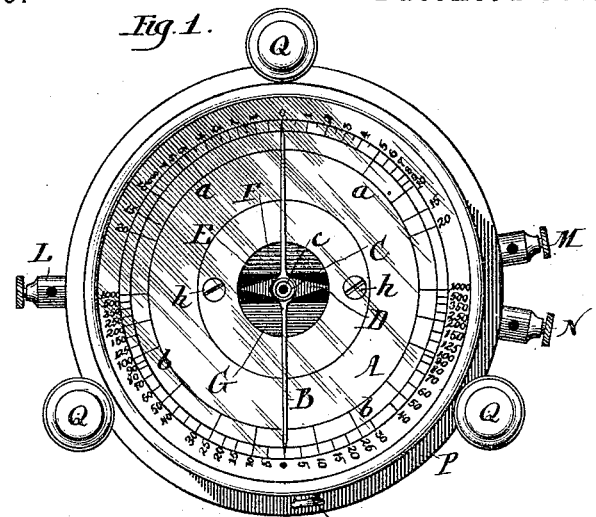
Figure 2:
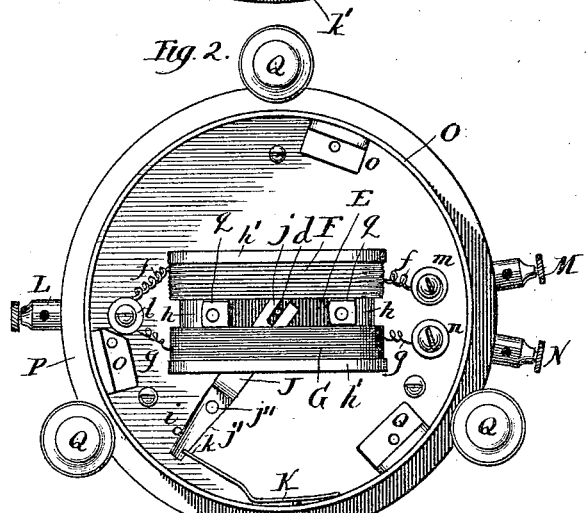
Figure 3:
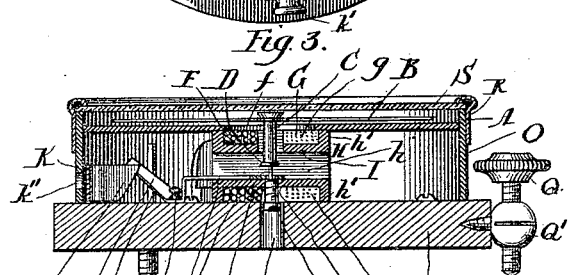

Figure 1 is a face view of the meter complete. Figure 2 is a face view with the glass cover removed. Fig. 3 is a center cross-section through the meter, showing the pointer or indicator and its support in elevation.

This invention relates to millampère-meters designed for measuring delicate galvanic currents, and is more especially intended for the use of physicians and others in measuring a galvanic current passing through the human body in the electrical treatment of patients, but can be used and is adapted for use in making other delicate electric-current measurements, and belongs to that class of such meters in which a needle or indicator held normally in the direction of terrestrial magnetism, is deflected by the electric current and in which the effects of the current is multiplied by means of a coil of wire or helix. These meters have a scale for denoting deflection of the needle and thereby indicating the amount of the current, which scale is graduated from 0 to 1,000 millampères, each division of the scale indicating a certain number of millampères, and for an easy deflection of the needle or indicator a short thick wire for the helix is used, while for a greater deflection a long thin wire is used. The scale of the meter must indicate both an easy and greater deflection, and with a single scale, as such meters are now made, it is difficult to read the register where a very delicate current is needed or used, owing to the small space on the scale for the measurements.

The object of this invention is to construct a millampère-meter which will accurately and correctly register a current from half a millampère up to a thousand millampères, and by which the registration can be easily read and determined, whether it be of a very delicate current or one which has a greater deflection, and which will offer the least resistance in and of itself, and therefore performs the required work in a reliable and perfect manner, producing great excellency in accuracy of calibration; and the nature of the invention consists in providing a double scale to coact with the needle or indicator, one running from 0 to 20 and operating in conjunction with a short thick helix-wire and the other running from 0 to 1,000 and operating in conjunction with a long thin helix-wire, both scales working in connection with the same needle or indicator, and in the several parts and combination of parts hereinafter described, and pointed out in the claims as new.

In the drawings, A represents a face-plate having thereon a scale $a$, running from 0 to 20 on both sides of a center line, and a scale $b$, running from 0 to 1,000 on both sides of a center line, the two scales $a$ occupying one half or side of the plate and the two scales $b$ occupying the other half or side of the plate, as clearly shown in Fig. 1. The scale $a$ is the shortest, and the spaces from 0 to 5 thereon is divided to indicate half-millampères, while on the scale $b$, which is longer than the scale $a$, each division of the spaces up to thirty marks five millampères. The small scale $a$ will indicate up to twenty millampères, and the long scale $b$ will indicate up to one thousand millampères, and the short scale $a$ is for a very delicate current up to twenty millampères, and the long scale $b$ is for a delicate current requiring greater deflection of the needle or indicator.

B is a needle or indicator projecting equally on both sides of a center, and standing when in its normal position with one end on the cipher-line of the scale $a$ and the other end on the cipher-line of the scale $b$, as shown in Fig. 1, and in this position the needle or indicator stands in the direction of terrestrial magnetism.

C is a socket, to which the needle B is attached, which socket has an agate or other hard center $c$ for contact with the carrying or supporting point.

D is an armature secured at its center to the lower end of the socket C and standing at right angles to the needle or indicator B.

The needle or indicator and the armature D are both carried by the socket C and are supported by a hardened steel point $d$, which engages the center $c$, so that in connection with the center $c$ an extremely delicate bearing is had. The point $d$ projects from a screw $e$, which is inserted through an opening $e'$ in the base of the instrument.

E is a longitudinal opening or passage between the sections or divisions of the helix, through which the armature D is passed, to locate the armature in position.

F is a transverse opening in the frame of the helix for allowing the armature to turn or swing.

G is the helix, formed of a short coarse wire $f$ and a long fine wire $g$, the short coarse wire wound on one side of the frame and the long fine wire on the other side in the construction shown; but the long fine wire could be wound over the short coarse wire on the two sides of the frame, both wires being insulated, or the wires could be otherwise wound.

H is the frame of the helix, formed of a top and bottom plate $h$, joined at the ends and having on each side a flange $h'$, extending entirely around the top, bottom, and ends. The top plate has therein the longitudinal opening E, and between the top and bottom plates $h$ is the transverse opening F for the swing of the armature D. The frame H can be cast or otherwise formed into the shape shown or other suitable shape to receive the wires of the helix and have the openings E and F for the passage and swinging of the armature.

I is the space between the flanges $h'$ for receiving the helix-wires.

J is a lever having in its acting end a slot $j$ to straddle the point $d$ and having its tail end $j'$ standing at an upward inclination. This lever is supported by a pin or pivot $j''$, on which it can rock, so as to raise and lower the acting end, and it is held against side swing by a stop-pin $i$, projecting up from the base of the instrument, to which base the lever J is attached by the pin or pivot $j''$.

K is a sliding arm or plate having an acting end K with an inclined edge to engage the upturned end $j'$ of the lever J, and this arm or plate K is moved by a knob $k'$ on the outside of the wall of the case, having a stem passing through a slot $k''$ in the case side wall and attached to the arm or plate K.

L is a binding-post for the attachment of a cord or wire from the battery and which is connected with a short coarse wire $f$ of the helix by a screw $l$.

M is a binding-post for the attachment of an electrode cord or wire and which is connected with the short coarse wire of the helix by a screw $m$.

N is a binding-post for the attachment of an electrode cord or wire and which is connected with the long fine wire $g$ of the helix by a screw $n$. The fine wire $g$ of the helix also runs to the screw $l$, and thereby has connection with the binding-post L.

O is the side wall of the case, formed, as shown, of an annular band and inclosing the parts of the instrument.

P is a base, to which the side wall O is attached by blocks $o$, which base has the opening $e'$ for the passage of the screw $e$, which carries the point $d$ and attaches the frame H to the base P. This base P has the lever J pivoted thereto and receives the binding-posts L, M, and N and the connecting-screws $l$, $m$, and $n$, as shown in Fig. 2.

Q are leveling-screws passing through nuts Q', attached to the base P and by means of which the instrument can be leveled. The face-plate A is attached to the frame H by screws $p$, which enter lugs $q$, one on each end of the frame, as shown in Figs. 1 and 2, and when in place the plate is in such relation with the needle or indicator and the helix as to have the scale $a$ coact with the short coarse wire $f$ and the scale $b$ coact with the long fine wire $g$.

R is a band slipping onto the side wall O.

S is a glass carried by the band R and forming a cover for the instrument when the band R is on the instrument for the purpose of excluding dust and dirt and enabling the scale to be read.

The parts are assembled as follows: The frame H, with the short coarse wire $f$ and the long fine wire $g$ wound thereon to form the helix G, is placed on the base P, and the screw $e$, with the sharp point $d$, is inserted through the opening $e'$ and entered into the bottom plate $h$ of the frame, attaching the frame and helix in position. The slot $j$ of the lever J is slipped onto the point $d$, and the lever J attached to the base P by the pin or pivot $j''$ and the pin $i$ inserted in the base P. The screws $l$, $m$, and $n$ are inserted in the base P and the coarse wire $f$ and fine wire $g$ of the helix connected thereto for the coarse wire to connect with the screws $l$ and $m$ and the fine wire with the screws $l$ and $n$. The shifting arm or plate K is attached to the band O by the knob $k'$ and its stem, and the band O is secured to the base P for the acting end $k$ of the arm or plate K to engage the inclined end $j'$ of the lever J by the block $o$ and suitable rivets or screws. The face-plate is dropped into position within the band R and secured to the frame H by the screws $p$. The needle B, attached to the socket C, with the armature D, is dropped into position by entering the armature in the opening E for the point $d$ to enter the socket and have the center $c$ rest on the end of the point when the slotted end of the lever J is dropped and be held clear of the point $d$ when the slotted end of the lever J is raised. The band R, with the glass S therein, is slipped onto the side wall O, inclosing the devices. The binding-posts L, M, and N are entered into the base P to engage the screws $l$, $m$, and $n$, respectively, and form a communication between the binding-posts and the wires of the helix. The nuts Q' are secured in the base P and the adjusting-screws Q entered into the nuts, completing the instrument ready for use.

In use, the instrument is placed to have the ciphers in a line due east and west, and so that the needle or indicator points in that direction, for which purpose the shifting arm or plate is receded, withdrawing its acting edge $k$ from the tail or inclined end $j'$ of the lifting-lever J, allowing the inclined end $j$ to drop, lowering the acting end of the lever J for the center $c$ to rest on the end of the point $d$ and suspend the needle or indicator free and clear. The leveling-screws Q are then adjusted to have the instrument stand perfectly level horizontally. The cord or wire from the positive pole of the battery is then connected to the binding-post L, and for a delicate current, where but little deflection for the measurement of a small number of millampères is required, the cord or wire from one electrode is connected to the binding-post M, and the cord or wire from the other electrode is connected to the negative pole of the battery and the electrodes placed where desired on the body of the patient. The current will pass through the short thick wire of the helix and deflect the needle or indicator, and the deflection will be registered by the short scale $a$ of the face-plate A, and, as this scale up to 5 is graduated for half-millampères, the measurements will be in millampères and half-millampères up to 5, and from 5 to 20 in millampères, so that with the scale $a$ a measurement as small as a half-millampère can be taken and from that up to 20 millampères, thus enabling a very small current to be registered and measured, and, as the spacing of the small scale is wide, the reading of a measurement of half a millampère is had without any trouble or difficulty.

A measurement of a delicate current of over twenty millampères is had by the long scale $b$, and for this measure the cord or wire from the positive pole of the battery is connected to the binding-post L, the cord or wire of one electrode is connected to the binding-post N, and the cord or wire of the other electrode connected to the negative pole of the battery. The electrodes are applied when desired on the body of the patient, and the current will pass through the body of the patient and through the long fine wire of the helix to deflect the needle or indicator, and the deflection will be registered by the long scale $b$ of the face-plate A. This scale registers up to one thousand millampères, or a full ampère, and each division of the first thirty marks or spaces measures five millampères, and from that on the increase is according to the numbers up to one thousand millampères, and from this scale $b$ measurements in five millampères up to thirty can be had and from thirty to one thousand, according to the numbers of the divisions or spaces.

The scales $a$ and $b$ are both graduated by standard measurements, and in use the instrument is to be considered as the standard for a given battery, instead of regarding the battery as the standard by which the instrument is to be gaged, and when not in use the needle or indicator is to be raised, so as not to have the center $c$ bear on the end of the point $d$, which is done by advancing the shifting arm or plate K for its acting end $k$ to engage and force down the inclined end $j'$ of the lever J, raising the acting end of such lever for the end to raise the needle-socket and armature and hold the needle or indicator off its bearing point.

It is to be observed that the instrument will have the least possible resistance in and of itself and will give the best results attainable in making measurements, and that by its use the measurements from half a millampère up to one thousand millampères can be registered by and with the same needle or indicator and so as to be easily and quickly read, requiring no change in the instrument, but simply a change in the attachment of the electrode cord or wire, and will give the exact measurement of a delicate current, and in using the instrument for electric treatment of patients the current should always be passed through the body of the patient, and if used for measuring a galvanic current, as for testing cells or for other purpose, the current should be passed through a resistance-coil or its equivalent.

The instrument will be found perfectly efficient and reliable and can be easily placed in circuit, and by its use a delicate galvanic current can be measured to a nicety and the measurement observed, thereby enabling a physician to give the same strength of current with each treatment, which is very desirable and necessary.

The short scale $a$ is graded to twenty millampères, but can be extended farther, if desired, and the space between the first five measures is sufficient to take a quarter-millampère, if so desired, and for ordinary and general use the division of the scale $a$ to twenty is all that is required, as beyond twenty the measurements can be taken on the scale $b$.

What I claim as new, and desire to secure by Letters Patent, is—

1. The combination, in a millampère-meter, of a face-plate having on one side a short scale and on the opposite side a long scale, both scales arranged on the arc of a circle and both indicating millampères of measurement, and a deflecting-needle, one end coacting with the short scale and the other end with the long scale, substantially as and for the purposes specified.

2. The combination, in a millampère-meter, of a face-plate having on one side a short scale and on the other side a long scale, both scales indicating millampères of measurement, a deflecting-needle coacting at one end with the short scale and at the other end with the long scale, an armature moving the needle, and a helix turning the armature and formed of two coils, one coil a short thick wire and the other coil a long fine wire, substantially as and for the purposes specified.

3. The combination, in a millampère-meter, of a face-plate having on one side a short scale and on the other side a long scale, indicating millampères of measurement, a deflecting-needle coacting at one end with the short scale and at the other end with the long scale, an armature moving the needle, a helix turning the armature and formed of two coils, one coil a short thick wire and the other coil a long fine wire, a binding-post for receiving a battery-wire and connected with both wires of the helix, a binding-post for an electrode-wire and connected with the short thick wire of the helix, and a binding-post for an electrode-wire and connected with the long fine wire of the helix, substantially as and for the purposes specified.

4. The face-plate A, having the short scale $a$ for millampère measurements and long scale $b$ for millampère measurements arranged on opposite sides of the plate, in combination with the deflecting-needle B, one end indicating on the scale $a$ and the other end indicating on the scale $b$, for measuring delicate galvanic currents, substantially as and for the purposes specified.

5. The face-plate A, having the short scale $a$ for millampère measurements and a long scale $b$ for millampère measurements arranged on opposite sides of the plate, in combination with the deflecting-needle B, one end indicating with the scale $a$ and the other end indicating with the scale $b$, socket C, armature D, and helix G, having two coils, one formed of the short thick wire $f$ and the other formed of long fine wire $g$, substantially as and for the purposes specified.

6. The face-plate A, having the scale $a$ for millampère measurements and long scale $b$ for millampère measurements arranged on opposite sides of the plate, in combination with the deflecting-needle B, one end indicating with the scale $a$ and the other end indicating with the scale $b$, socket C, armature D, helix G, having two coils, one formed of the short thick wire $f$ and the other formed of the long fine wire $g$, binding-post L, connected with the wires $f$ and $g$, binding-post M, connected with the wire $g$, and binding-post N, connected with the wire $g$, substantially as and for the purposes specified.

LYMAN D. McINTOSH.

Witnesses:
O. W. BOND,
J. C. MACGREGOR.